Patented Mar. 28, 1950

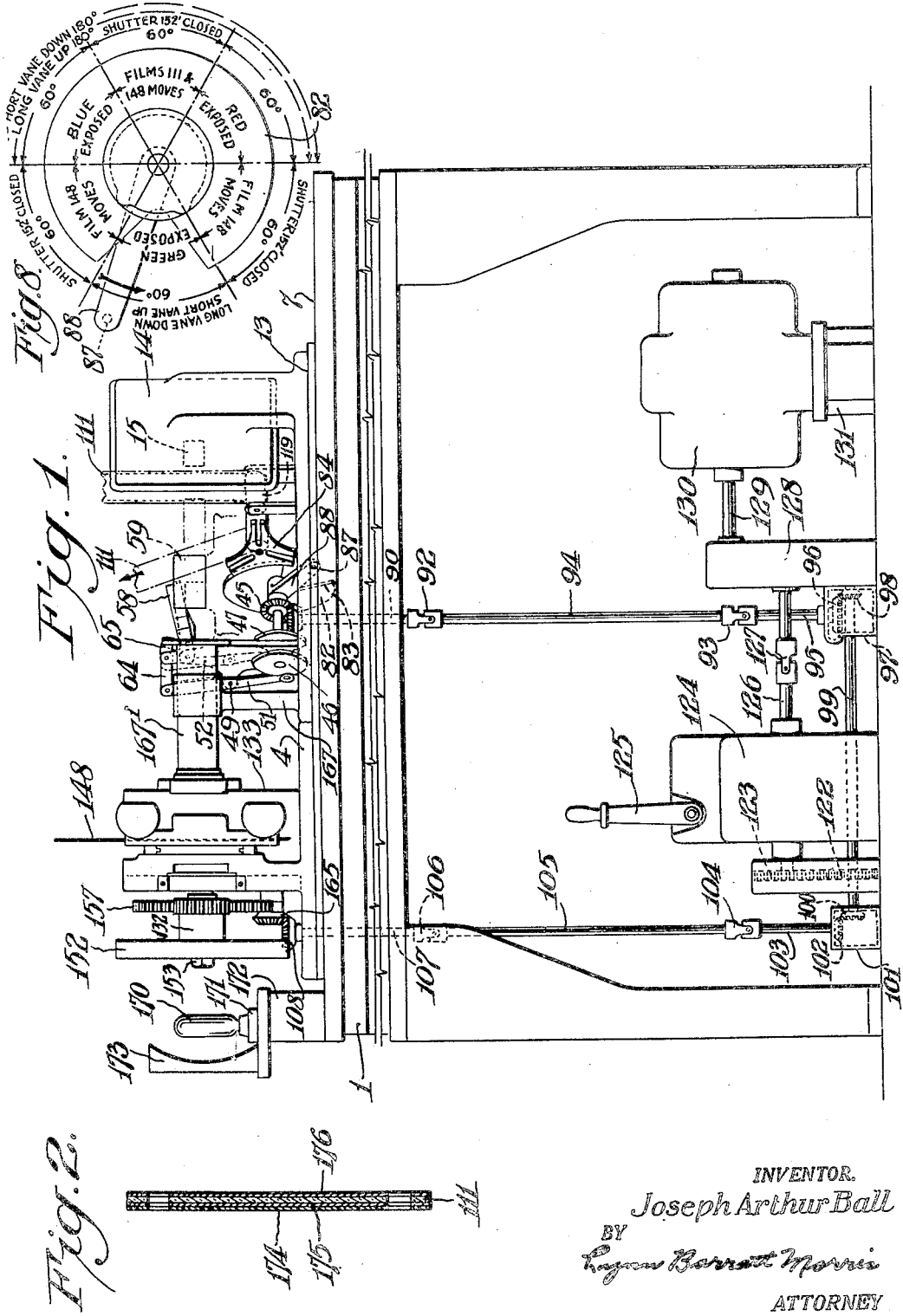
March 28, 1950 — J. A. BALL — 2,502,305
OPTICAL PRINTING DEVICE
Filed Aug. 24, 1948 — 4 Sheets-Sheet 1
INVENTOR.
Joseph Arthur Ball
BY
Rogers Barrett Morris
ATTORNEY

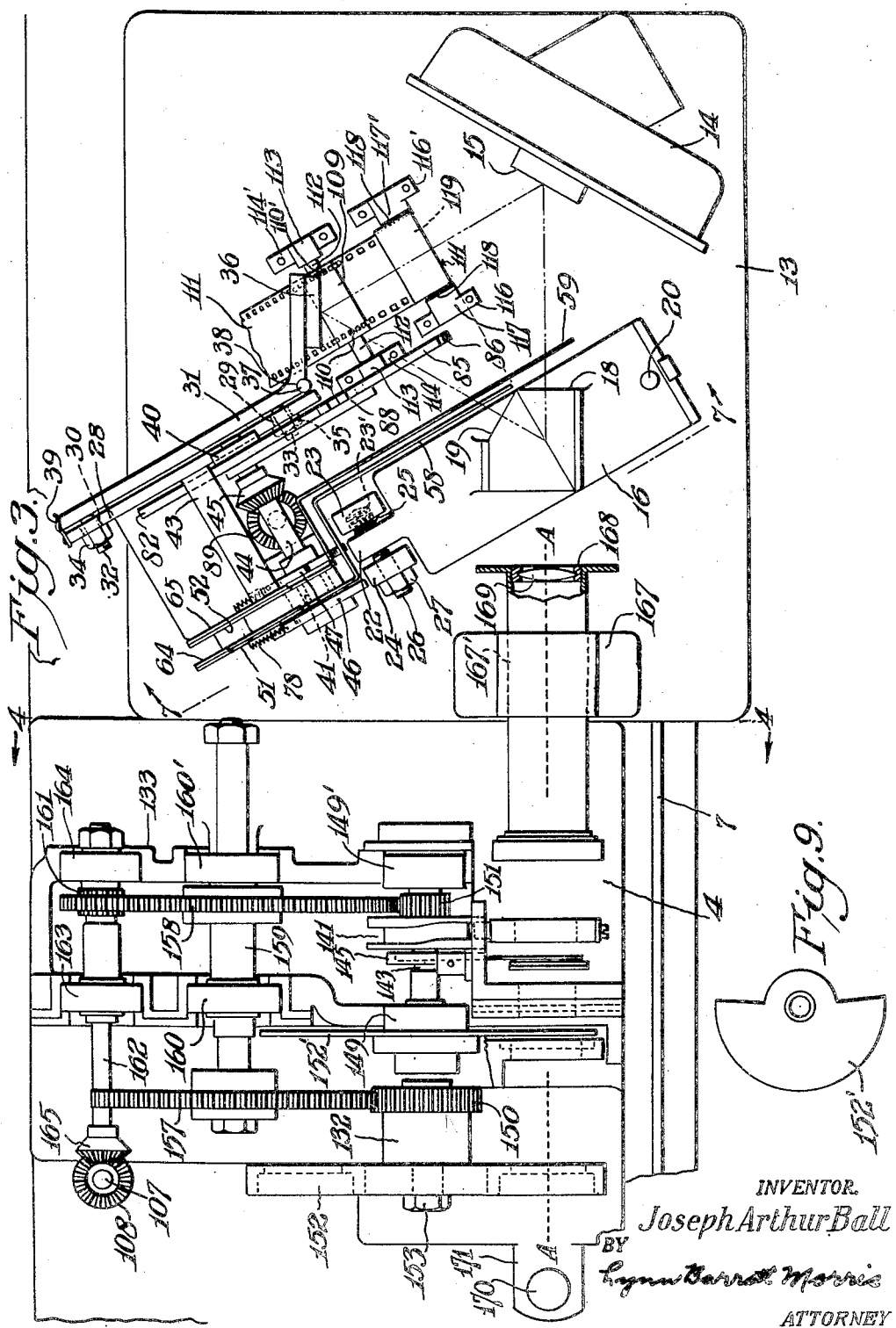

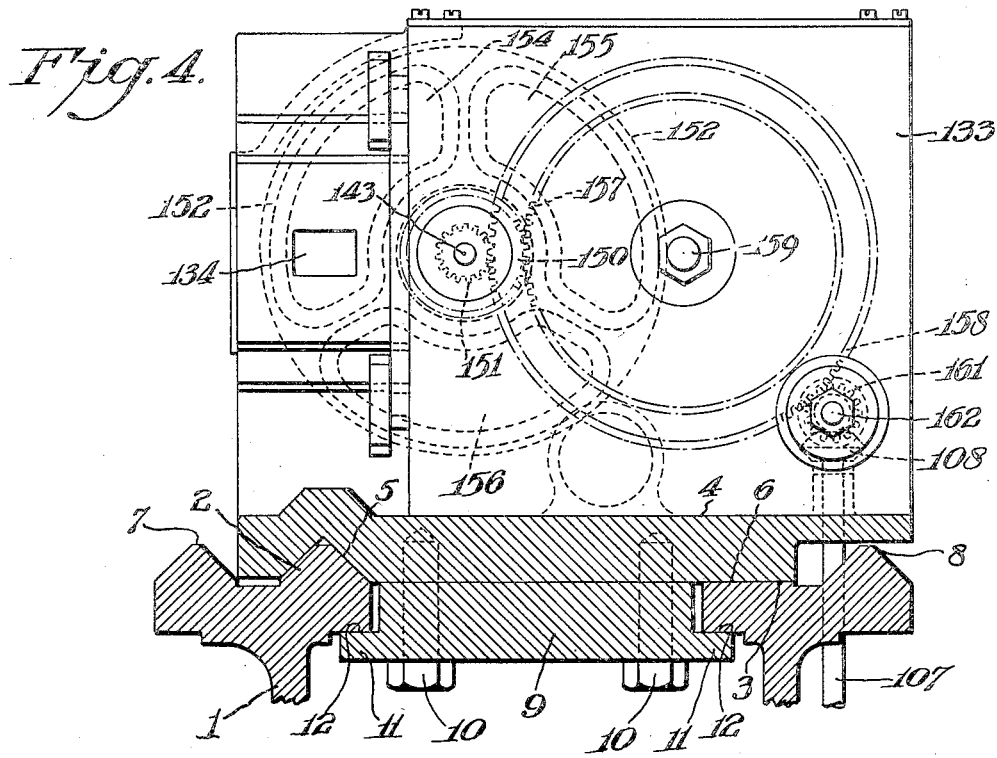
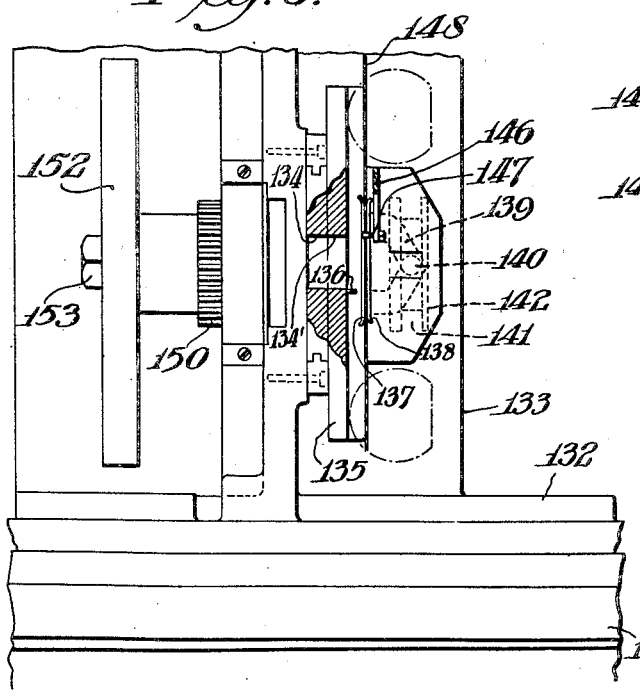
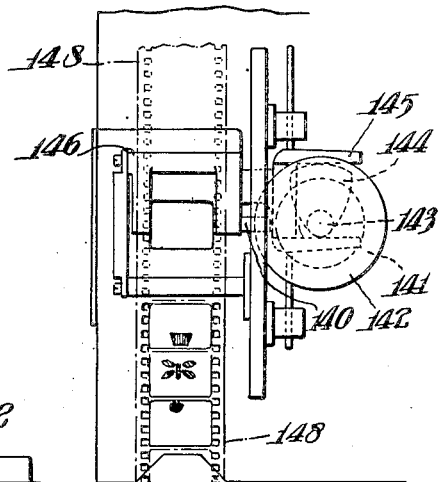

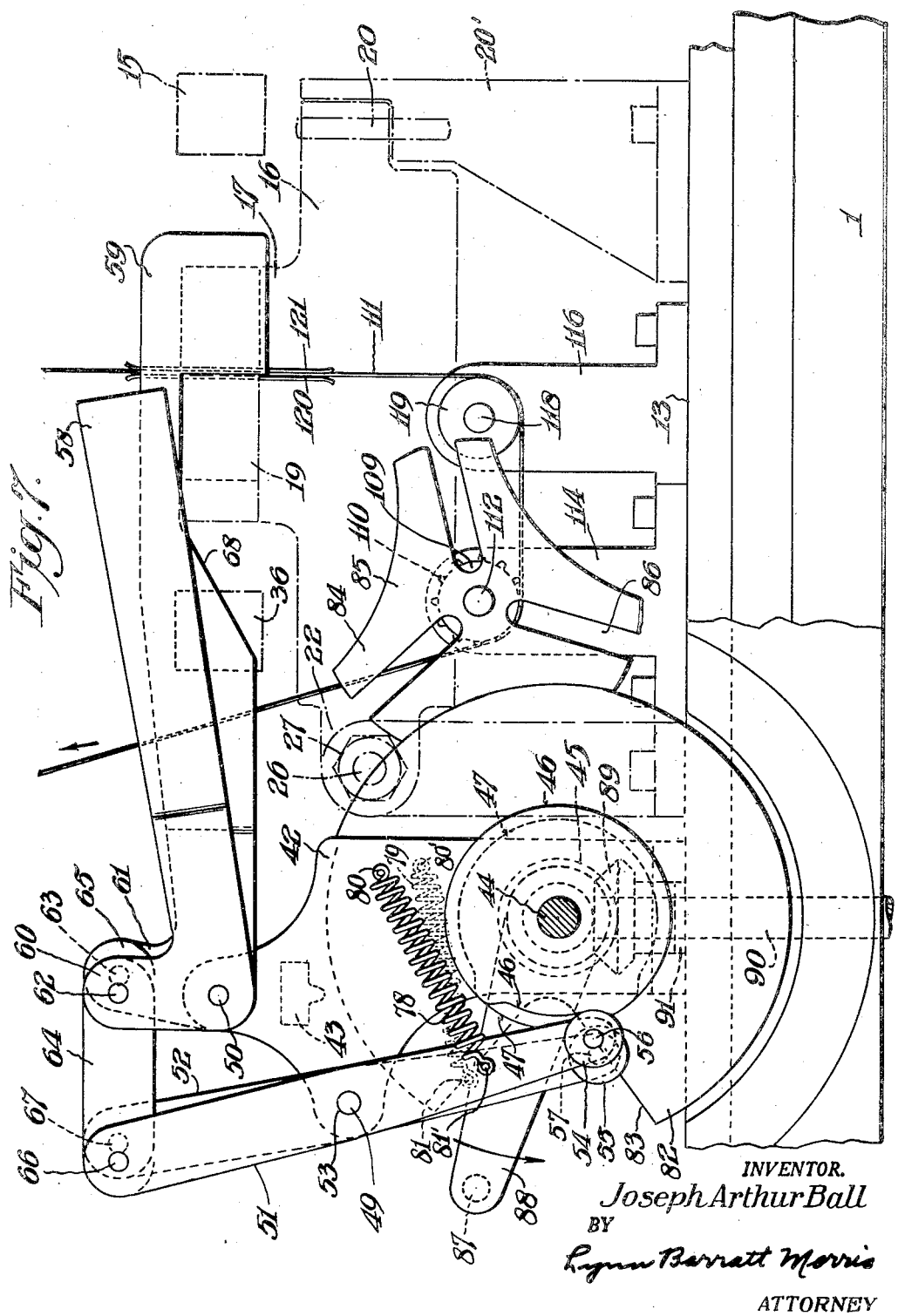

2,502,305

UNITED STATES PATENT OFFICE 2,502,305

OPTICAL PRINTING DEVICE

Joseph A. Ball, Los Angeles, Calif., assignor to E. I. du Pont de Nemours & Company, Wilmington, Del., a corporation of Delaware Application August 24, 1948, Serial No. 45,885

1 Claim. (Cl. 88—24)

This invention relates to photography and more particularly to an optical printing device. Still more particularly it relates to an optical printing device for printing color separation records onto opposite light-sensitive strata of a photographic film element.

An object of this invention is to provide a new and useful optical printing device. Another object is to produce such a device whereby color separation records can be successively printed in super-position into layers of a multilayer film element. A further object is to produce such a device wherein the records can be printed in opposing light-sensitive strata of a multilayer photographic element from opposite directions.

The optical printing device of this invention is useful for printing color separation records in super-position or exact registration in separate strata of a multilayer film element. It permits one of the records to be printed through the base of the film element and two records to be printed directly onto the emulsion surface or strata of a film element. The printing device has a triangular path and is simple but accurate in construction and operation. The device enables one to print rapidly and accurately three component color records, e. g., red, green, and blue, which are disposed in cycle sequence along a motion picture film, onto a multilayer light-sensitive motion picture film in register. The novel optical printing device will now be described with reference to the accompanying drawings which form a part of this specification and wherein the same reference numerals refer to the same parts throughout the several views.

In the drawings:

Fig. 1 is an elevation of the optical printing device and associated mechanism mounted on a suitable frame;

Fig. 2 is a transverse section of a light-sensitive film which is exposed by the device of Fig. 1;

Fig. 3 is a plan view of the optical printing device and associated mechanism for shifting the picture film;

Fig. 4 is an elevation of the sector wheel at the picture aperture with the base and supporting frame in section;

Fig. 5 is an elevation of the film-shifting mechanism;

Fig. 6 is an elevation of the picture film-shifting mechanism with parts in section; and Fig. 7 is an elevation of the vane-shifting mechanism of the triangular path optical printing device;

Fig. 8 is a diagram of a vane sequence;

Fig. 9 is an elevation of a suitable shutter having a 170° opening.

Referring now more particularly to Figs. 1, 3, and 4, a frame 1 has slidably mounted on machined ways 2 and 3 a base 4 for a picture film-shifting mechanism. This base has a V-shaped groove 5 and a flat portion 6 which interfit with the V-shaped and flat ways on the frame. Additional ways 7 and 8 are provided on the frame for mounting the film-shifting mechanism, the triangular path printing device, or other devices. The base has secured to its bottom surface a heavy plate 9 by means of bolts 10. The plate has lateral flange portions 11 which fit under the rails 12 of the frame and keep the base in firm operative contact with the ways.

A base 13 for the triangular path printing device is also similarly slidably mounted on ways 2 and 3 of the frame. It may be retained by a heavy flanged plate similar to 9 if desired. The base 13 has an integral or separate bracket 14 which carries mirror 15. The base 13 also serves as a support for pivoted plate 16 which has a pair of prisms 18 and 19 mounted in raised portion 17 of its upper surface. Prism 18 has a 30°–60°–90° triangular cross-section and prism 19 has the cross-section of a truncated equilateral triangle. The two prisms are cemented together with a partially reflecting partially transmitting metallic film in between. Together the prisms make a light splitting block capable of splitting entering rays into two parts and to reflect one part at an angle of 120° with respect to the entering ray while permitting the other part to emerge without change of direction. The bracket is pivoted at its center near its outer end on pivot pin 20 which is mounted in a bracket 20' which is affixed to the base. The inner end of the bracket base is reduced to form a tongue 22 which is disposed between two lugs 23 and 24 which are integral with base 13. They, like bracket 20', may be affixed to the base by means of bolts or screws or may be welded to the base. Lug 23 has a cylindrical cavity 23' in which there is mounted a spring 25 which abuts against one side of the tongue. The other lug 24 is screw-threaded and has set screw 26 threadably engaged therewith. The inner end of the screw abuts on one side of the tongue. The screw is secured in adjusted position by means of locking nut 27.

Base 13 also carries a third bracket 28 which has two holes 29 and 30 which are disposed in the same horizontal plane near its upper edge. This bracket serves as a support for a mirror frame 31 which is bolted to said bracket by means of spaced bolts 32 and 33 which pass through holes 29 and 30 and are locked in position by means of nuts 34 and 35. The holes are larger than the bolts which permits some adjustment of mirror frame 31 and also of mirror 36 which is carried thereby. The inner end of frame 31 has a roller 37 in arcuate groove 38. The outer end of the arm is pressed by a spring 39.

It will be noted that the centers of the cemented faces of prisms 18 and 19 form the apex of a 60° angle in the bifurcated optical axis, the branches of which lead to mirrors 15 and 36, respectively. The surfaces of mirrors 15 and 36 are disposed so that light proceeding along the optical axes is reflected from the surface of each at an angle of 60° to the incident ray. The apexes at the mirrors together with the bifurcation at the prism form an equilateral triangle and a triangular path for light which enters the system from a lamp along dotted axis A—A.

A pair of spaced bearings 40 and 41 are provided in the third bracket 28 and in bracket 42 which is similarly welded, bolted, or screwed to base 13. A reinforcing web 43 extends between brackets 42 and 28 as shown in Fig. 7 of the drawing. This may be part of an integral casting with 42 or welded, bolted, or screwed to brackets 28 and 42. Shaft 44 is journaled in the bearings and is turned by means of gear 45 which is attached to the shaft, e. g., by means of a set screw or key. The left end of the shaft carries two vane-actuating cams 46 and 47 which are spaced on each side of bracket 42 by means of collar 48. The cams are attached to the shaft by means of a set screw or key so that they will rotate with the shaft and gear.

The upper end of bracket 42 is disposed at an angle and carries spaced pivot pins 49 and 50 which extend past each side surface. Cam follower links 51 and 52 are mounted on the lower pivot pin 49 by means of pivot holes 53 and 53' near their centers. The lower end of links 51 and 52 carry rollers 54 and 55 which are journaled on pins 56 and 57 near the end of follower links. Light-obstructing vanes 58 and 59 are journaled on pivot pin 50 at the upper part of bracket 42. These vanes are in the form of a bell crank and the short arms 60 and 61 carry pivot pins 62 and 63 on which are mounted links 64 and 65 that are connected to the upper ends of cam follower links 51 and 52, respectively, by means of pivot pins 66 and 67. The cam follower links and rollers are maintained in operative association with the cam surface by means of tension springs 78 and 79 which are attached to hooks 80 and 80', on bracket 42 and hooks 81 and 81', and on cam follower links 52 and 51. Vane 59 is cut away as shown at 68 to allow passage of light when vane 58 is in its upper position.

Cams 46 and 47 have their surfaces so designed that the vanes will move up and down in a predetermined order. Their movement is correlated with the film-shifting mechanism for the picture-bearing film. The movement of the cams is correlated with a Geneva movement which shifts the light-sensitive motion picture film, which is to be printed on, in a certain sequence.

The Geneva movement consists of a Geneva cam 82 with a cut-away portion 83 which is adapted to receive the three points 84 of the Geneva star wheel 85. Slots 86 in the points are actuated by pin 87 on arm 88 which is attached to and moves with the cam 82. The Geneva cam 82 and arm 88 are mounted on shaft 44 and move with the shaft and vane-actuating cams 46 and 47 upon the turning of bevel gear 45. The latter gear meshes with bevel gear 89 which is keyed to vertical operating shaft 90. A collar 91 separates the hub of the bevel gear from base 13. Universal joints 92 and 93 connect shaft 94 to shaft 90 and a shaft 95 which has a bevel gear 96 at its lower end, which meshes in gear box 97 with bevel gear 98 on the end of horizontal shaft 99 having a bevel gear 100 on its other end which meshes in gear box 101 with bevel gear 102 on vertical shaft 103 and is connected through universal joint 104 to shaft 105, which in turn is connected through universal joint 106 to vertical shaft 107 carrying bevel gear 108 which operates the picture-bearing film shifting mechanism. Gears 98 and 96 have a 3 to 1 ratio. The operation of such mechanism will be described later.

The Geneva star wheel in the triangular path printer is affixed to a sprocket 109 which has two spaced sets of teeth 110 and 110' which engage with the perforations in light-sensitive motion picture film 111. The shaft ends 112 of the sprocket and star wheel rotate in bearings 113 at the upper ends of brackets 114 and 114' which are fixed to base 13 by means of screws 115. Spaced from brackets 114 and 114' are similar brackets 116 and 116' which have bearings 117 and 117' near their upper ends which receive the ends 118 of guiding roller 119 which has its periphery tangential to the plane of the film 111 as it passes between guide plates 120 and 121. This plane also coincides with the plane of the prisms at their interface as more clearly shown in Fig. 3. The light-sensitive film moves in a definite predetermined manner which is correlated with the movement of the picture-bearing film which is to be printed onto such light-sensitive film 111. This correlation is accomplished by means of shafts 94 and 105 and the appropriate mechanism.

Shaft 99 is driven by means of gear 122 which meshes with gear 123 which is driven through a multi-speed clutch mechanism 124, the speed of which is changeable by means of handle 125. The clutch mechanism is driven by means of shaft 126 which contains a universal joint 127. The shaft passes into gear box 128 which is driven by means of shaft 129 of motor 130 mounted on base 131.

The mechanism for shifting the picture-bearing film will now be described. This mechanism is mounted on a plate which has carefully machined ways which are identical with those of plate 13, and the construction of such plate for convenience will not be repeated. A vertical housing 133 is integral with the plate and contains various gears and cams for driving a shutter, filter wheel and the film-shifting mechanism. The housing is not shown in Fig. 3 for the sake of clarity. However, in Fig. 4 the housing is shown with certain of the enclosed parts being present in outline. The housing has in one wall of an extension a rectangular opening 134 through which light rays pass from a source of light. A plate 135 which carries registration pins 136 is mounted on the wall adjacent the opening 134 and has a similar opening 134'. A pair of film-guiding plates 137 and 138 which are carried by a yoke member 139 are also disposed adjacent the aperture. The latter member has a tongue 140 which fits into the groove 141 of cam 142. This cam is mounted on a shaft 143 which also carries heart-shaped cam 144. A yoke 145 fits around the latter cam and has a U-shaped plate 146 which carries pins 147 which pass through the perforations in the picture-bearing film 148. Upon rotation of the shaft, the cam 142 causes the film and guide plates to move to the left and seat upon registration pins 136. While so seated, light rays pass through the film and to the triangular path printing device. While the printing operation is proceeding, a further turning of cam 144 then moves yoke 145 and plate 146 downwardly until pin 147 has moved a full picture frame and is opposite the corresponding perforation of the next picture frame in the motion picture film. Cam 142 then moves the guide plates and film to the right off pins 136 and onto pins 147. Upon further rotation of the shaft, cam 144 moves yoke 145, plate 146 and the film upwardly the distance of one frame and the movement just described repeats itself. The film-shifting device just described is an old and well-known mechanism and is described in Howell U. S. Patent 1,038,586.

Shaft 143 is mounted in suitable bearings 149 and 149' and has attached to it a gear 151. Rotatably mounted on shaft 143 but not attached thereto is a drum 132 carrying a filter wheel 152 and gear 150. This drum is held in place by means of a nut 153. Mounted also on shaft 143 and fastened to it is a shutter 152' which serves to cut off the illumination during film shifting. The filter wheel 152 has three segmental openings 154, 155, and 156 adapted to receive colored gelatin or glass filters to color the printing light in any desired manner. The shutter 152' and camshaft 143 turn once for each picture frame. The filter wheel 152, however, turns at ⅓ of the speed of the shutter and camshaft so that the three openings in the filter wheel are brought successively into the light beam.

Gears 150 and 151 mesh with gears 157 and 158, respectively, which are mounted on parallel shaft 159 which is journaled in bearings 160 and 160'. The latter gears mesh with gear 161 on parallel shaft 162 which is similarly journaled in bearings 163 and 164. The left end of the shaft carries bevel gear 165 which meshes with bevel gear 108 which is driven by motor 130 through the gear and drive shaft arrangement shown.

A bracket 167 is fastened to base 13. It supports tube 167' which in turn carries a lens mount 168. Lens 169 is fixed in the mount and its optical axis passes through the approximate center of aperture 134 and hence through the center of each successive picture frame. Light from an incandescent lamp 170 which is mounted on a base 171 on bracket 172 on frame 1 is directed along the optical axis A—A by reflector 173.

A film element as shown in Fig. 2 of the drawing is threaded through the guide plates 120 and 121 and over sprocket 109 and roller 119 of the triangular path printer. This film 111 has three emulsion layers, 174, 175, and 176, which may be, for example, sensitive to blue, red, and blue light, respectively. Blue-sensitive emulsion layer 174 faces mirror 15. Film element 148 which bears red, green, and blue color component silver image records in cycle sequence is placed on registration pins 136 opposite projection aperture 134. Light passes from lamp 170 through red filter segment 154 of the filter wheel and encounters the blue record on film 148 which is therefore printed in layer 175 of film 111 while vane 59 is up and vane 58 is down. Shaft 143 is turned and the green record is shifted before aperture 134 and printed by light passing through the clear opening 155 onto layer 176 of film 111 while vane 58 is up and vane 59 is down. The red record is then shifted before aperture 134 while vane 58 is lowered and vane 59 is raised. Light from lamp 170 passes through clear segment 156 of the filter wheel and by means of it, the red record is printed in layer 174. As the blue picture record in the next sequence in film 148 is shifted before the aperture, film 111 is shifted one frame by means of the co-action of cam arm and star wheel. The action of the vane cams and star wheel cam are shown schematically in Fig. 8 of the drawing. This figure is self-explanatory.

Shafts 94 and 105 are driven by means of shaft 99 through gears 100 and 102 and gears 98 and 96. The latter gears have a 3 to 1 ratio thereby making shaft 105 revolve at three times the speed of shaft 94. By this arrangement the positive or picture-bearing film moves one frame for every three frames that the negative film moves. One complete revolution of the cam shaft (which corresponds to three revolutions of the shutter shaft at the negative aperture) will give a complete cycle operation of the vanes and advance the positive film one frame during each such revolution.

In Fig. 7 the device is ready to print the green record onto the light-sensitive film. This position is shown in order to better portray the position of the vanes in an operative printing position.

While a Geneva cam and star wheel has been shown for actuating the film-shifting sprocket, the invention is not limited to such a mechanism as other gear, cam and/or linkage mechanisms can be used in place thereof. Similarly, vane shifting gears, cams, and/or linkages can be substituted for that shown.

The triangular path printing device is, of course, mounted in a suitable light-proof housing so that the light rays will not expose the positive film except during the brief intermittent periods when it passes the positive aperture when printing is effected.

A unique feature of the apparatus is that there is no motion of the duplitized or duplicoated positive film while the printing of all three components is carried out. It is not necessary, therefore, to have registration pins at the positive printing aperture. Furthermore, printing at the negative aperture requires only one pair of pins on which the three component pins are brought to position successively. Thus, the registration problems are considerably simplified as compared with a contact registering printer.

The apparatus is simple and effective and once set requires no attention. It is entirely automatic and reliable and enables one to continuously print three color separation records in cycle sequence in register.

Instead of having two film sprockets as shown in Fig. 7, roller 119 can be eliminated and the star wheel and sprocket disposed in line with film 111, if desired. This can be accomplished by shifting the shaft 44 and attendant mechanism by varying the size of the cam and star wheel, etc.

What is claimed is:

An optical printing apparatus comprising the combination of a motion picture film-shifting mechanism, shutter and 3-unit filter sector wheel for regularly shifting a picture-bearing motion picture film in a regular 3-cycle frame sequence with a triangular path printer comprising a copying lens, a light-dividing prism and two mirrors which are disposed so that the reflected and transmitted branches of the optical axis of the lens through the prism form an equilateral triangle, a film guide and aperture in the focal plane between the two mirrors, the light-dividing surface of the prism being coplanar with the aperture wherein the film to be printed is situated, and the intersection of this plane with the normals to the two mirrors forming angles of 120° each, said intersection forming the center of an equilateral triangle whose apices are the center of the mirrors and the center of the light-dividing surface, means for shifting the film frame by frame at the aperture actuated by a Geneva star wheel, a cam follower and arm for actuating the Geneva star wheel, a light-obstructing vane in the optical path from the prism to the first mirror and a light-obstructing vane in the optical path from the said prism to the second mirror, cam means for actuating said vanes in a regular cycle sequence which is correlated with the film-shifting mechanism for the picture-bearing film, said shutter turning once for each picture frame and said filter wheel turning at one-third the speed of the shutter and of the Geneva cam and vane shifting cams.

JOSEPH A. BALL.

REFERENCES CITED

The following references are of record in the file of this patent:

UNITED STATES PATENTS

| Number | Name | Date |
|---|---|---|
| 1,235,176 | Brewster | July 10, 1917 |
| 1,580,115 | Brewster | Apr. 13, 1926 |